(12) United States Patent
Oshima et al.

(10) Patent No.: US 10,324,249 B2
(45) Date of Patent: Jun. 18, 2019

(54) DISPLAY DEVICE

(71) Applicant: Japan Display Inc., Minato-ku (JP)

(72) Inventors: Tetsuya Oshima, Minato-ku (JP);
Masaki Nishikawa, Minato-ku (JP);
Yasuhisa Shiraishi

(73) Assignee: Japan Display Inc., Minato-ku (JP)

( * ) Notice: Subject to any disclaimer, the term of this patent is extended or adjusted under 35 U.S.C. 154(b) by 124 days.

(21) Appl. No.: 15/245,651

(22) Filed: Aug. 24, 2016

(65) Prior Publication Data
US 2017/0059765 A1 Mar. 2, 2017

(30) Foreign Application Priority Data

Aug. 31, 2015 (JP) ................................. 2015-170623

(51) Int. Cl.
| | | |
|---|---|---|
| *F21V 8/00* | (2006.01) | |
| *G02B 6/00* | (2006.01) | |
| *G02F 1/1335* | (2006.01) | |

(52) U.S. Cl.
CPC ............. *G02B 6/0053* (2013.01); *G02B 6/00* (2013.01); *G02B 6/0055* (2013.01); *G02B 6/0065* (2013.01); *G02F 1/133504* (2013.01); *G02F 2001/133507* (2013.01)

(58) Field of Classification Search
CPC .................................................. G02B 6/0053
See application file for complete search history.

(56) References Cited

U.S. PATENT DOCUMENTS

| | | | | |
|---|---|---|---|---|
| 2006/0109687 | A1* | 5/2006 | Campbell | G02B 5/045 362/627 |
| 2015/0062493 | A1* | 3/2015 | Yoon | G02B 6/0053 349/65 |
| 2015/0109561 | A1 | 4/2015 | Fuchida et al. | |
| 2016/0116807 | A1* | 4/2016 | Lim | G02F 1/134309 349/37 |

FOREIGN PATENT DOCUMENTS

| | | |
|---|---|---|
| JP | 2007-41015 | 2/2007 |
| JP | 2013-235259 | 11/2013 |

\* cited by examiner

*Primary Examiner* — Anh T Mai
*Assistant Examiner* — Zachary J Snyder
(74) *Attorney, Agent, or Firm* — Oblon, McClelland, Maier & Neustadt, L.L.P.

(57) ABSTRACT

A display device includes a prism sheet between a display cell and a light guiding plate. The prism sheet includes a plurality of prisms having a constant apex angle continuously arranged in a second direction on a surface thereof opposed to a light-exiting surface of the light guiding plate. Each of ridge lines of the prisms extends in a first direction. Each prism has a first inclined face on a side on which light from the light guiding plate is incident and a second inclined face on a side reflecting the incident light. An area of the first inclined face is made smaller than an area of the second inclined face, and an area of a light-emitting region in the prism sheet is made larger than an area of a non-light-emitting region.

4 Claims, 18 Drawing Sheets

18A

FIG. 1
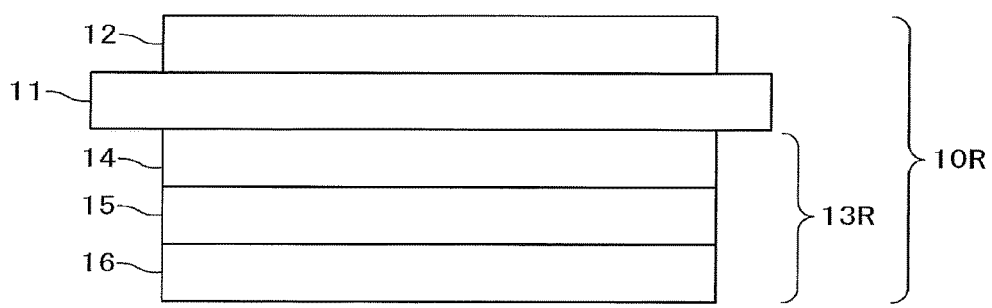
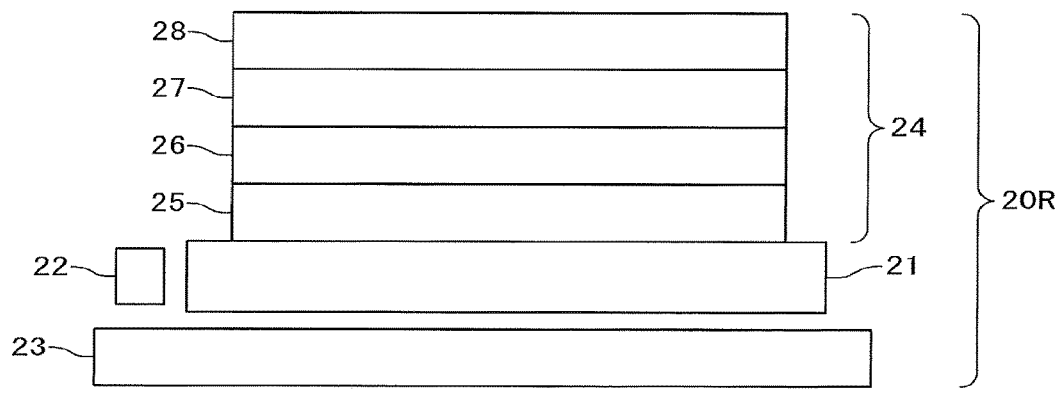
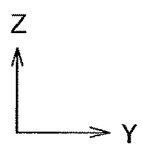

| ANGLE OF PRISM | 0° | 4~5° | 6° |
|---|---|---|---|
|  |  | NO MOIRE |  |

F I G . 1 3
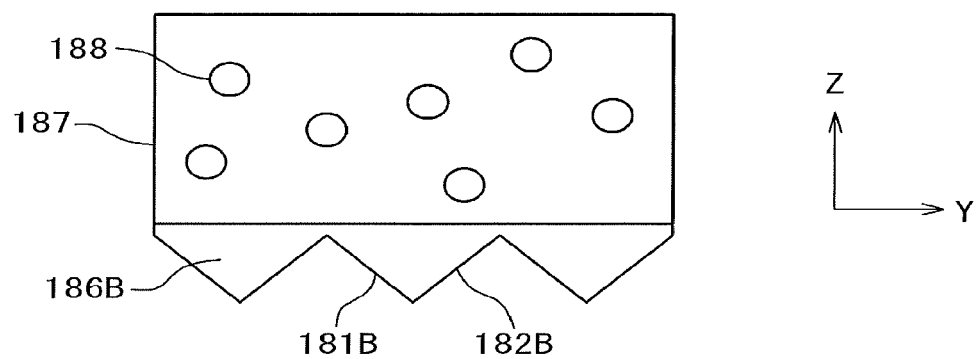
F I G . 1 4
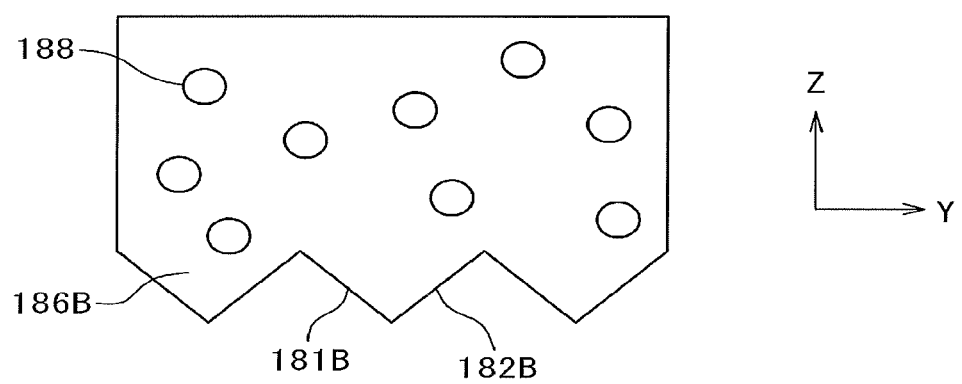

FIG.22
| BIAS ANGLE | (A) | (B) |
|---|---|---|
| 0° | 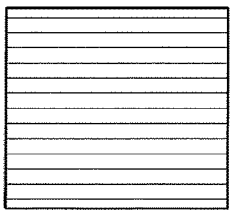 | 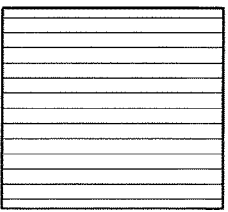 |
| 1° | 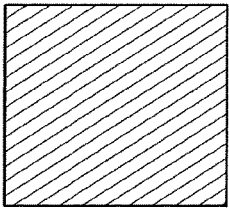 | 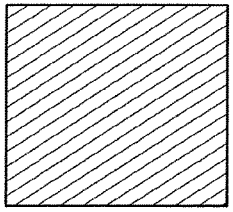 |
| 2° | 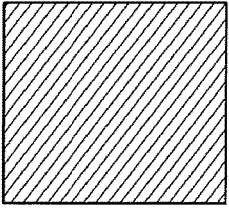 | 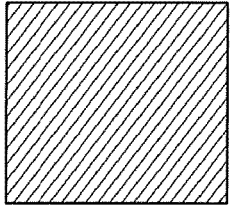 |
| 3° | 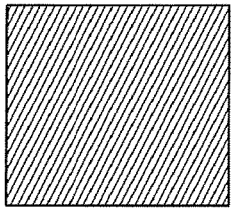 | 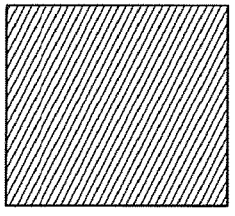 |

DISPLAY DEVICE

CLAIM OF PRIORITY

The present application claims priority from Japanese Patent Application No. JP2015-170623 filed on Aug. 31, 2015, the content of which is hereby incorporated by reference into this application.

BACKGROUND

The present disclosure relates to a display device and is applicable to a display device using a prism sheet, for example.

In a display device including an edge-lit type surface light source, light emitted from the light source is incident on a light guiding plate, and propagates in the light guiding plate while repeating total reflection at a light-exiting surface and a back surface of the light guiding plate. A portion of the light propagating in the light guiding plate changes its traveling direction because of a light scattering member or the like provided at the back surface of the light guide plate, for example, to exit to the outside of the light guiding plate from the light-exiting surface. The light that has exit from the light-exiting surface of the light guiding plate is diffused and concentrated by various kinds of optical sheets, e.g., a diffusion sheet, a prism sheet, and a luminance-improving film, and thereafter is incident on a display panel in which polarizers are arranged on both sides of a display cell. In a case where the display cell is a liquid crystal cell, for example, liquid crystal molecules in a liquid crystal layer are driven on a pixel-by-pixel basis to control transmission and absorption of the incident light. Consequently, an image is displayed (see Japanese Patent Application Publication No. 2013-235259, for example).

Related art of the present disclosure is described in Japanese Patent Application Publication No. 2007-41015, for example.

SUMMARY

A liquid crystal display device using an edge-lit type surface light source has a problem of generation of moire fringes (interference fringes) caused by a regular structure of a prism sheet.

Other problems and novel features will be apparent from the description of the present disclosure and the accompanying drawings.

The summary of a typical portion of the present disclosure is briefly described as follows.

A display device includes a display panel and a backlight unit including a light guiding plate. The display panel includes a display cell, e.g., a liquid crystal cell, and a prism sheet between the display cell (the liquid crystal cell) and the light guiding plate. The prism sheet includes a plurality of prisms having a constant apex angle continuously arranged in a second direction on a surface thereof opposed to a light-exiting surface of the light guiding plate. Each of ridge lines of the prisms extends in a first direction. Each of the prisms has a first inclined face on a side on which light from the light guiding plate is incident and a second inclined face on a side reflecting the incident light. An area of the first inclined face is made smaller than an area of the second inclined face, and an area of a light-emitting region in the prism sheet is made larger than an area of a non-light-emitting region.

BRIEF DESCRIPTION OF THE DRAWINGS

FIG. 1 is a cross-sectional view of a display device according to a first comparative example.

FIG. 13 is a cross-sectional view illustrating a configuration of a prism sheet in a display device according to a second embodiment.

FIG. 14 is a cross-sectional view illustrating a configuration of a prism sheet in a display device according to a first modification of the second embodiment.

FIG. 22 shows an image of moire fringes for the pixel arrangements in FIGS. 21A and 21B.

DESCRIPTION OF THE REFERRED EMBODIMENTS

Figure 2:
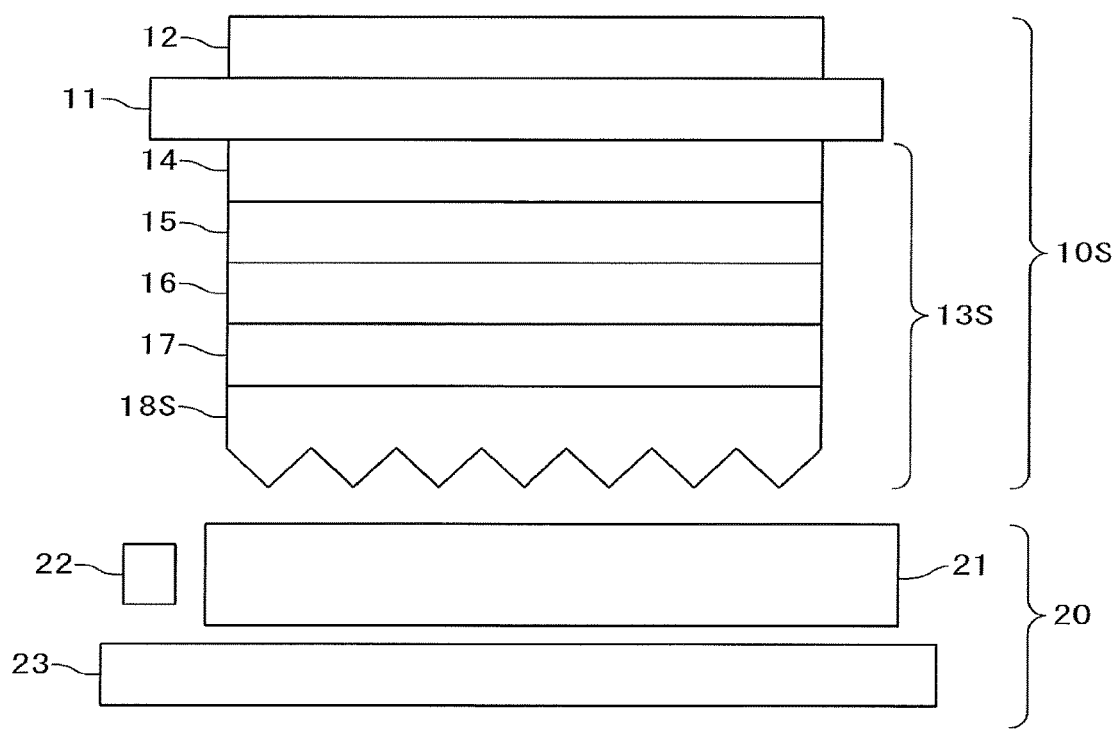
FIG. 2 is a cross-sectional view of a display device according to a second comparative example.

Comparative examples, and embodiments and modifications thereof are described below, referring to the drawings.

The disclosure is merely an example. Appropriate changes that can be easily conceived within the summary of the invention should be contained in the scope of the present invention. In addition, surfaces may be schematically illustrated as to the width, the thickness, the shape, and the like of each portion, as compared with embodiments, for the sake of clearer explanation. However, those are merely an example and do not intend to limit interpretation of the present invention. Further, the same components in this specification and the drawings as those in the drawings already described are labeled with the same reference signs, and the description thereof may be omitted as appropriate.

First Comparative Example

First, a technique studied by the inventors of the present application prior to this disclosure (hereinafter, referred to as a first comparative example) is described.

FIG. 1 is a cross-sectional view of a display device according to the first comparative example. The display device 1R includes a display panel 10R and a backlight unit 20R. The display panel 10R includes a liquid crystal cell (a display cell) 11, an upper polarizer 12, and a lower polarizer 13R. The lower polarizer 13R includes a polarizer film 14, a diffusing adhesive 15, and a luminance-improving film 16. The upper polarizer 12 includes a plurality of films containing a polarizer film. The backlight unit 20R is configured as an edge-lit type that includes a light guiding plate 21, a light source 22 arranged on one side end of the light guiding plate 21, a reflecting sheet 23 arranged on a back surface side (a lower surface side in FIG. 1) of the light guiding plate 21, and an optical sheet 24 arranged on a front face side (an upper face side in FIG. 1) of the light guiding plate 21. The light source 22 is formed by a single point light source or a plurality of point light sources using an LED (Light Emitting Diode), for example. The light guiding plate 21 is formed by an injection molded body of colorless transparent resin that is translucent in a wavelength band of light used for the light source, for example, acrylic-based resin. The reflecting sheet 23 has a foil of metal, e.g., silver, on its inner surface opposed to the light guiding plate 21, and has a function of reflecting light leaking from the light guiding plate 21 and light reflected from the optical sheet 24 to a front direction (upward in FIG. 1). The optical sheet 24 includes a lower diffusion sheet 25, prism sheets 26 and 27, and an upper diffusion sheet 28.

Second Comparative Example

Next, a technique aiming to omit the optical sheet 24 included in the backlight unit 20R in the first comparative example (hereinafter, called a second comparative example) is described.

FIG. 2 is a cross-sectional view of a display device according to the second comparative example. The display device 1S includes a display panel 10S and a backlight unit 20. The display panel 10S includes the liquid crystal cell 11, the upper polarizer 12, and a lower polarizer 13S. The lower polarizer 13S includes the polarizer film 14, the diffusing adhesive 15, the luminance-improving film 16, an adhesive 17, and a prism sheet 18S. The prism sheet 18S is bonded to the liquid crystal cell 11 via the polarizer film 14, the diffusing adhesive 15, the luminance-improving film 16, and the adhesive 17. That is, the prism sheet 18S is one of components forming the display panel 10S. The backlight unit 20 is configured as an edge-lit type that includes the light guiding plate 21, the light source 22 arranged on one side end of the light guiding plate 21, and the reflecting sheet 23 arranged on the back surface side (a lower surface side in FIG. 2) of the light guiding plate 21.

Figure 3A:
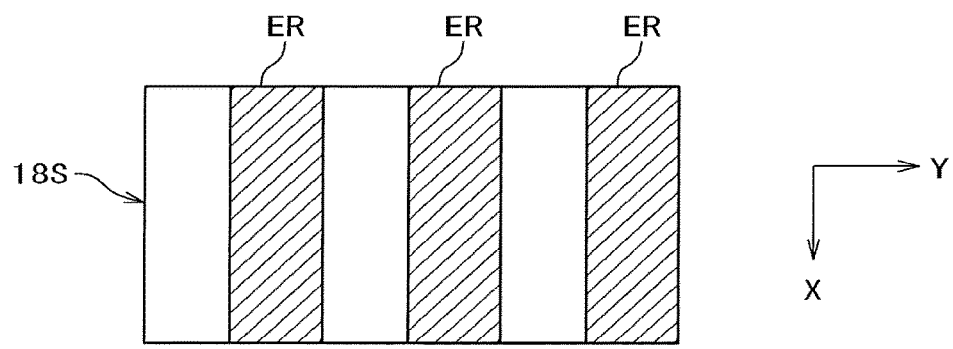
FIG. 3A is a plan view of a prism sheet in FIG. 2.
Figure 3B:
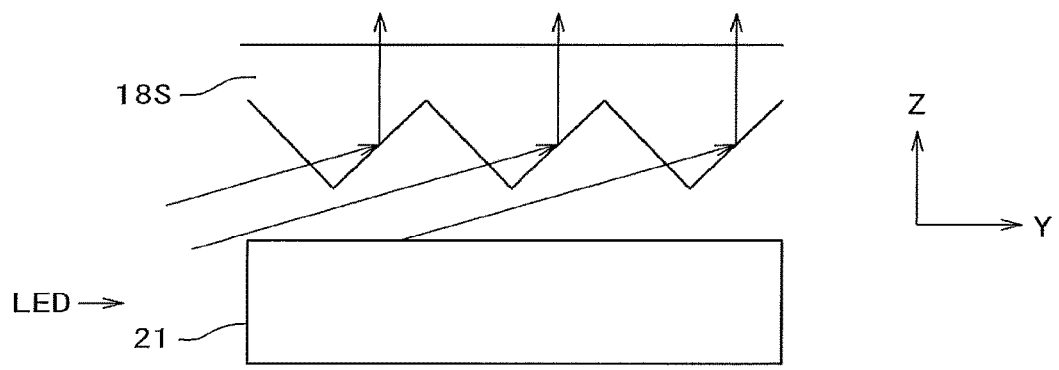
FIG. 3B is a cross-sectional view of the prism sheet and a light-guiding plate in FIG. 2.

FIG. 3A is a plan view of the prism sheet in FIG. 2, and FIG. 3B is a cross-sectional view of the prism sheet and the light guiding plate in FIG. 2. The prism sheet 18S has a prism face on its light guide plate 21 side. A direction in which prisms are formed is opposite to that in FIG. 1, and therefore the prism sheet 18S is sometimes called an anti-prism shape. The prism sheet 18S is configured by the prisms each having a convex cross section (a triangular shape, an approximately isosceles triangular shape, or an isosceles triangular shape) that are periodically arranged in the prism face at a fine pitch. Light exiting from a light-exiting surface (light-irradiating surface) of the light guiding plate 21 at a shallow angle is made incident on the prism from one inclined face (an incident-side inclined-face region) of that prism and is then totally reflected at the other inclined face (a light-emitting region), so that the light changes its direction to a perpendicular direction (the front direction of the display panel). Thus, light of the light source is concentrated to the front direction (a display-cell direction) and therefore a front luminance is improved.

Because the display device according to the second comparative example does not use the optical sheet in the backlight unit 20S, the thickness can be reduced. More specifically, as compared with the backlight unit 20R of the display device according to the first comparative example, the thickness can be reduced by 120 μm or more. Further, because no optical sheet is used, a risk of occurrence of Newton's rings or undulation of sheet can be reduced. In addition, in the display device according to the second comparative example, an absorption axis of the lower polarizer is perpendicular to guided light of the backlight, polarized light of the light guide plate can be used directly, the prism sheet 18S is a light-concentrating prism, and no optical sheet is used. Therefore, losses by the optical sheet can be reduced, so that the front luminance can be improved by 10%.

However, the prism sheet 18S has the light-emitting region ER periodically. Therefore, a problem of generation of moire fringes caused by interference with the periodicity of the display panel 10S or the light guiding plate 21 becomes apparent.

Figures 4, 5:
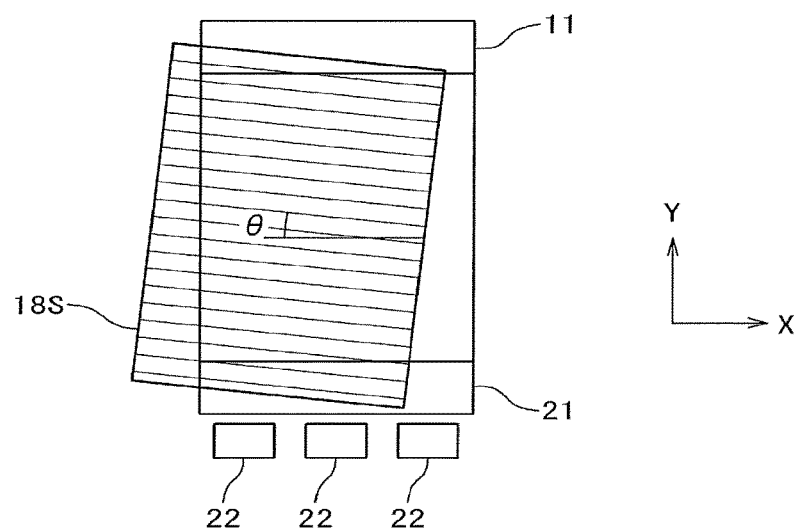
FIG. 4 is a diagram for explaining a prism angle in the display device of FIG. 2.
FIG. 5 shows a relation between the prism angle and moire fringes in the display of FIG. 2.
Figure 6:
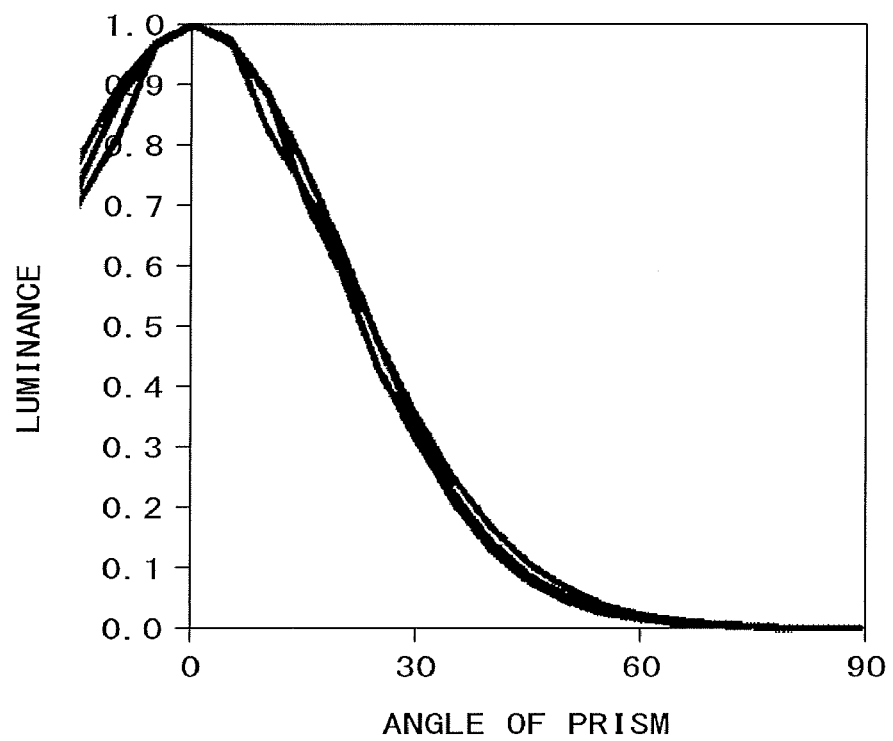
FIG. 6 shows a relation between the prism angle and a luminance in the display of FIG. 2.

FIG. 4 illustrates an example of an angle of prism in the display device of FIG. 2. FIG. 5 shows a relation between the angle of prism and moiré fringes in the display device in FIG. 2. FIG. 6 shows a relation between the angle of prism and a luminance in the display device in FIG. 2.

As illustrated in FIG. 4, the angle of prism (θ) refers to an angle between a direction of a ridge line of the prism (a line connecting apices of the prisms) and X-direction. Note that light travels from the light source 22 in Y-direction and X-direction and Y-direction are perpendicular to each other. As shown in FIG. 5, fine moire fringes (at a pitch of 0.3 mm) extending laterally appear when the angle of prism is 0°, whereas no moire fringes are generated when the angle of prism is in a range of 4° to 5°. However, when the angle of prism is 6°, oblique and thin moire fringes (at a pitch of 0.5 mm) appear. Although the shade of the moiré fringes may look the same in FIG. 5 between when the angle of prism is 0° and when the angle of prism is 6°, the moire fringes when the angle of prism is 6° is lighter. By rotating the direction of the prism ridge line (i.e., changing the angle of prism) while the liquid crystal cell 11 and the light guiding plate 21 are fixed, generation of the moire fringes can be avoided. However, as shown in FIG. 6, rotation of the direction of the prism ridge line reduces the luminance. The horizontal axis in FIG. 6 represents the angle of prism, while the vertical axis represents the luminance normalized with a luminance when the angle of prism is 0°.

<Embodiments>

Display devices according to embodiments reduce generation of moiré fringes by integrating a prism sheet with a lower polarizer and employing any of a configuration, a structure, and the like of the prism sheet that are described below or a combination thereof.
(1) Enlarging a light-emitting region
(1-1) Reducing an incident-side inclined-face region of the prism sheet
(First Embodiment)
(1-2) Configuring the prism sheet to be diffusible (Second Embodiment)
(1-2-1) Providing diffusibility within a base material of the prism sheet
(1-2-2) Providing a concave-convex shape to a prism surface
(2) Changing the structure
(2-1) Making a prism pitch of the prism sheet irregular (Third Embodiment)
(2-2) Making the prism ridge lines of the prism sheet non-uniform (Fourth Embodiment)
(2-3) Changing arranging directions of the prism sheet and pixels (Fifth and Sixth Embodiments)

First Embodiment

Figure 7:
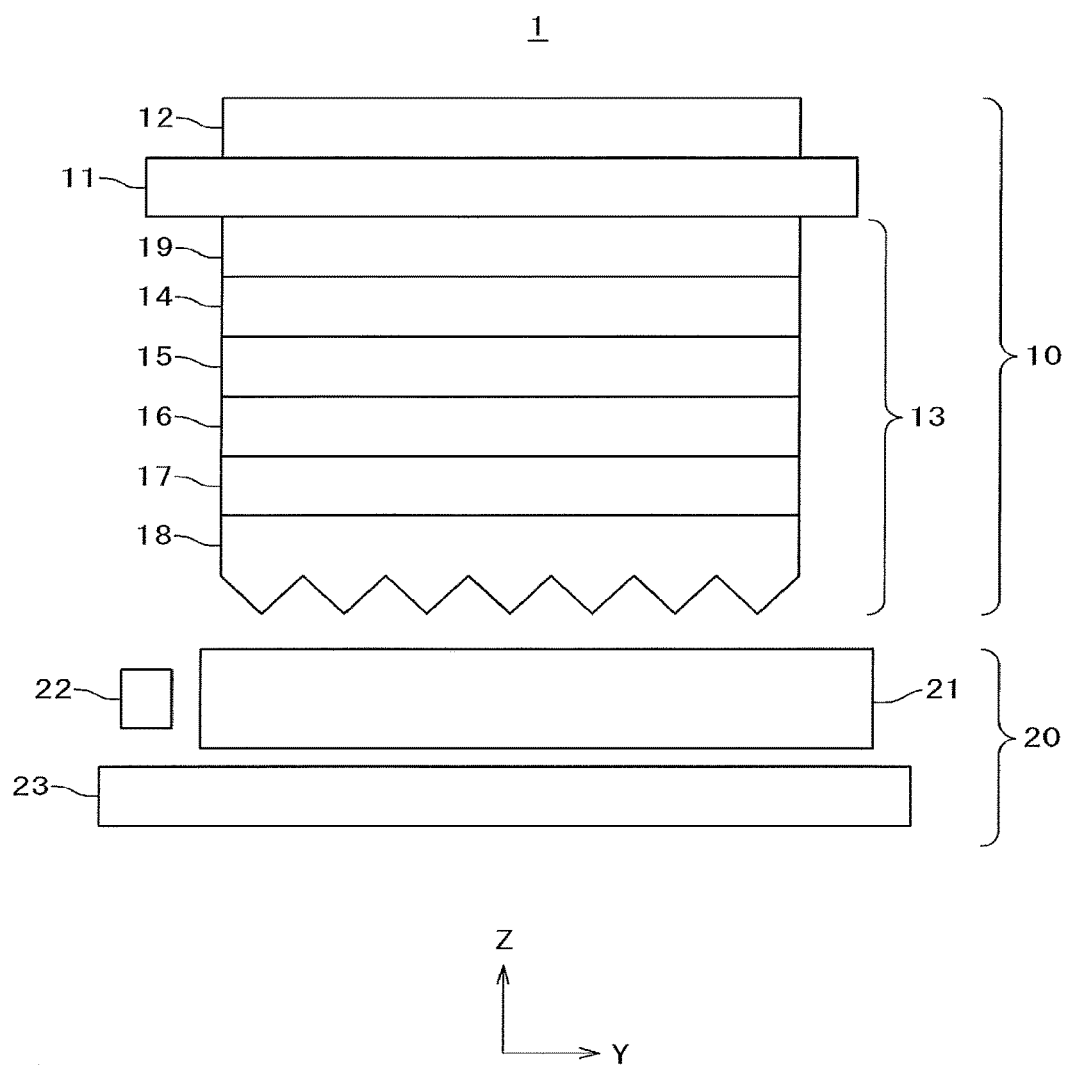
FIG. 7 is a cross-sectional view of a display device according to a first embodiment.

FIG. 7 is a cross-sectional view of a display device according to the first embodiment. The display device 1 includes a display panel 10 and the backlight unit 20. The display panel 10 includes the liquid crystal cell (the display cell) 11, the upper polarizer 12, and a lower polarizer 13. The lower polarizer 13 includes an adhesive 19, the polarizer film 14, the adhesive 15, the luminance-improving film 16, the adhesive 17, and a prism sheet 18. The prism sheet 18 is bonded to the polarizer film 14 via the adhesive and the film, and is attached to the liquid crystal cell 11. The backlight unit 20 is the same as that in the second comparative example.

Figure 8A:
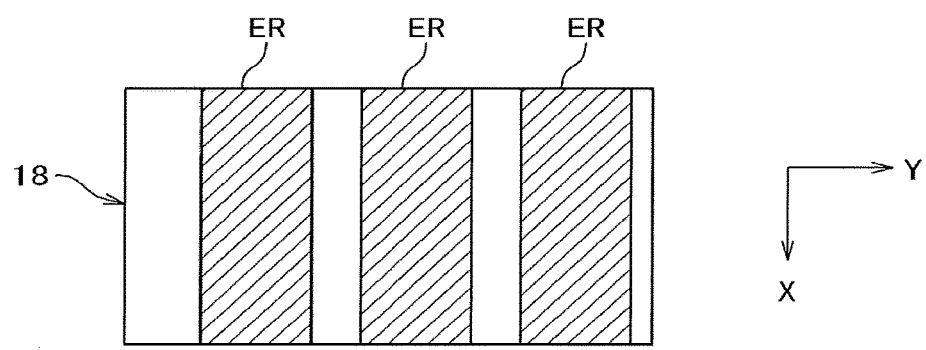
FIG. 8A is a plan view for explaining a prism sheet in FIG. 7.
Figure 8B:
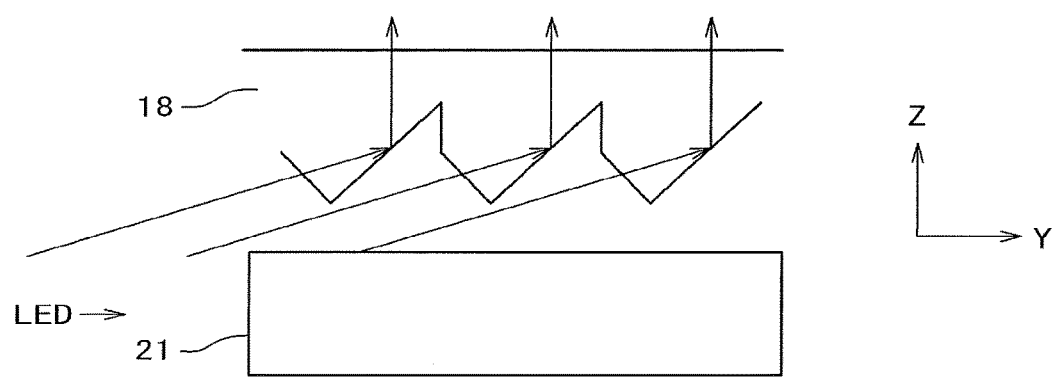
FIG. 8B is a cross-sectional view thereof.

FIG. 8A is a plan view for explaining the prism sheet in FIG. 7, and FIG. 8B is a cross-sectional view. The prism sheet 18 has a function of making an in-plane luminance distribution of light emitted from the backlight unit 20 uniform to efficiently direct the light to the front direction (upward in FIG. 8A). With this function, a front luminance can be improved. The prism sheet 18 is formed to have an antiprism shape and is arranged to be opposed to the light guiding plate 21 so that a prism-formed surface faces a light-exiting surface of the light guiding plate 21.

Figure 9:
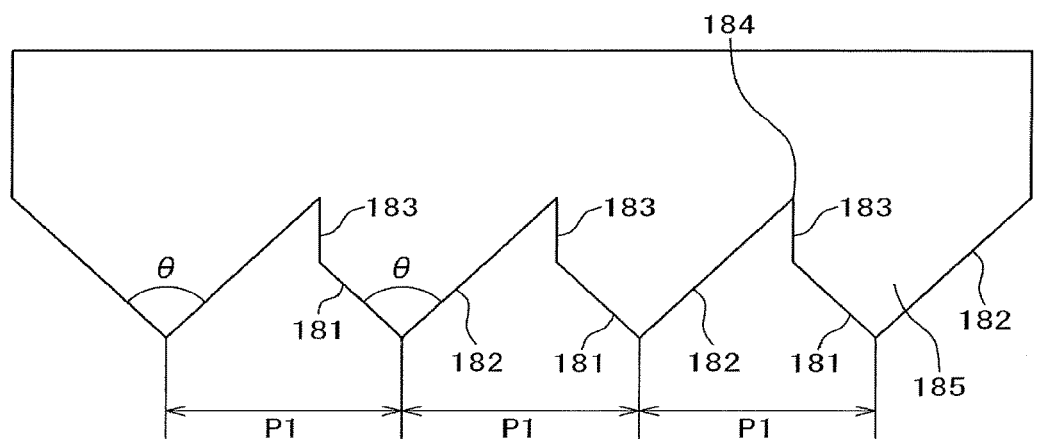
FIG. 9 is an enlarged cross-sectional view of the prism sheet of FIG. 8.

FIG. 9 is an enlarged cross-sectional view of the prism sheet of FIG. 8B. A plurality of prisms 185 having a constant apex angle (θ) are arranged continuously in one direction on a lower surface of the prism sheet 18 that serves as a light-incident surface. In a case where the prism sheet is applied to the edge-lit type backlight unit 20 as in the present embodiment, the prisms 185 are arranged along a direction in which light emitted from the point light source 22 mainly travels (Y-direction), and ridge lines of the prisms 185 are set to extend in a direction (X-direction) crossing the traveling direction (Y-direction) of the light of the point light source 22. Note that the extending direction of the ridge lines of the prisms 185 is perpendicular to the traveling direction of the light of the point light source 22 in the present embodiment, but the angular relation between those directions is not limited thereto.

An inclined face portion 181 that is one of a pair of prism inclined surfaces forming the prism 185, located to be closer to the light source than the other, is formed as an incident portion on which light exiting from the light-exiting surface of the light guiding plate 21 is incident. The other inclined face portion 182 is formed to be a total reflection surface that bends the light incident on the one inclined face portion 181 to the perpendicular direction.

The inclined face portion 181 is formed to have the same size (the length of inclination: the length of the inclined face portion) between the prisms 185. Also, the inclined face portion 182 is formed to have the same size (the length of inclination: the length of the inclined face portion) between the prisms 185. The inclined face portion 181 is provided with a perpendicular face portion 183 that extends to a base portion 184 of another adjacent prism (a left prism in FIG. 9). Thus, the area of the inclined face portion 181 is smaller than the area of the inclined face portion 182. Although the perpendicular face portion 183 is formed to be extend in a perpendicular direction (Z-direction) to a sheet face of the prism sheet (the light-exiting surface of the light guiding plate 21) in the present embodiment, the extending direction of the portion 183 is not limited thereto. The portion 183 may be slightly inclined from that perpendicular direction. The prisms 185 are formed have the same height and have the same arrangement pitch (the same distance (P1) between prism apices). A value of prism pitch/pixel pitch in the display cell is 0.1 to 0.5.

The prism sheet 18 is formed by a transparent film or sheet having light permeability. It is preferable to use acrylic-based resin or polycarbonate, for example.

Figure 10:
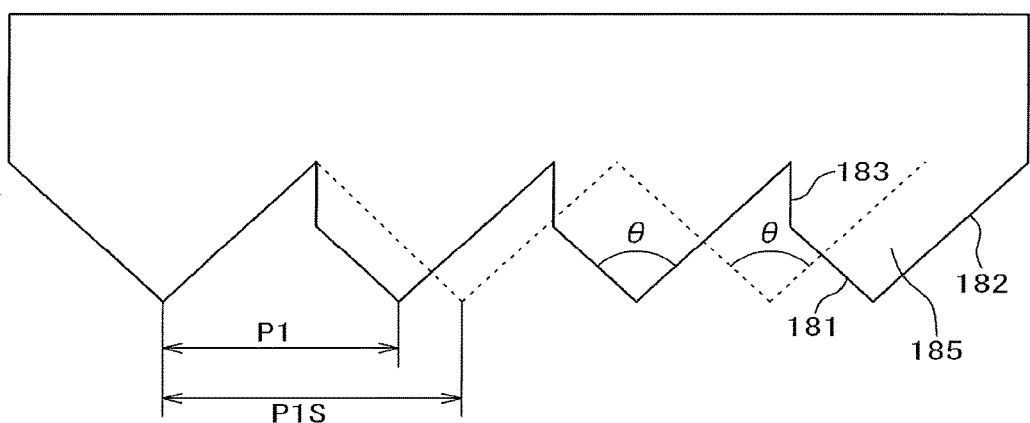
FIG. 10 is a cross-sectional view for explaining an example of the prism sheet of FIG. 9.

FIG. 10 is a cross-sectional view for explaining an example of the prism sheet of FIG. 9. In FIG. 10, broken line represents the prisms according to the second comparative example. In the prism sheet according to the present embodiment, one prism side face of each prism 185 is formed by different two faces, i.e., the inclined face portion 181 and the perpendicular face portion 183. Thus, it is possible to change a distance between the prisms in an arbitrary manner only by changing the formed height of the perpendicular face portion 183 without changing the apex angle and the height of the prism and the width in Y-direction of the inclined face portion 182 that determines the light-emitting region from which light exits. Therefore, the prism pitch (P1) in the present embodiment can be made smaller than the prism pitch (P1S) in the second comparative example. For example, while the width in Y-direction of one light-emitting region ER is kept constant, an interval with its adjacent light-emitting region ER is reduced. This increases an area ratio of the light-emitting region ER, resulting in reduction of generation of moire fringes. Also, because of the increase of the area ratio of the light-emitting region ER, lowering of the luminance can be reduced.

Figure 11:
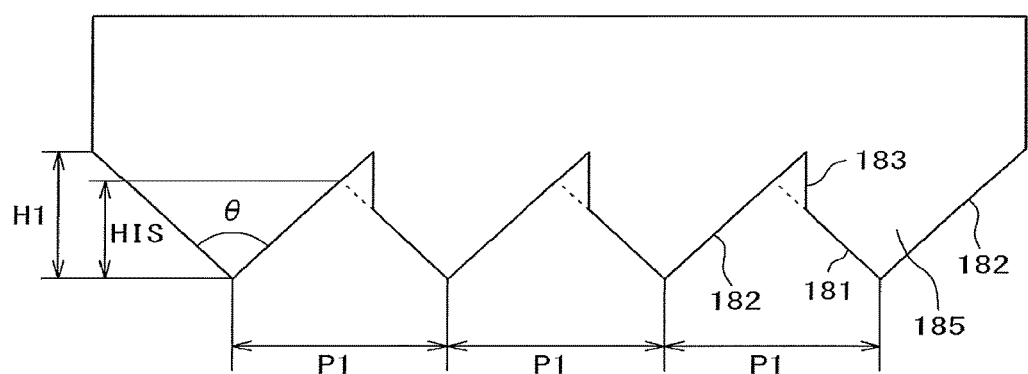
FIG. 11 is a cross-sectional view for explaining another example of the prism sheet of FIG. 9.

FIG. 11 is a cross-sectional view for explaining another example of the prism sheet of FIG. 9. In FIG. 11, broken line represents the prisms according to the second comparative example. The prism sheet according to the first embodiment can be also formed by changing the height of the prisms in the prism sheet according to the second comparative example without changing the apex angles (θ) of the prisms and the distance (P1) between the prisms. For example, the prism height (H1) in the present embodiment is set to be higher than the prism height (H1S) in the second comparative example, the inclined face portion 181 on the incident side of the prism in the present embodiment is set to be smaller than the inclined face portion on the incident side of the prism in the second comparative example, and the inclined face portion 182 on the reflecting side is set to be larger than the inclined face portion on the reflecting side in the second comparative example. With this configuration, the interval between the light-emitting regions ER is reduced, the area ratio of the light-emitting region ER is increased, and generation of moire fringes can be reduced. Also, because of the increase of the area ratio of the light-emitting region ER, lowering of the luminance can be reduced.

<Modification 1-1>

Figure 12:
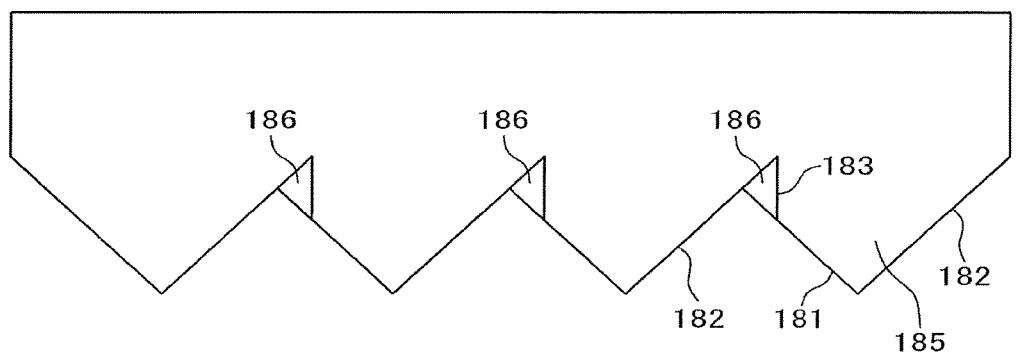
FIG. 12 is a cross-sectional view illustrating a configuration of a prism sheet according to a modification of the first embodiment.

FIG. 12 is a cross-sectional view illustrating a configuration of a prism sheet according to a modification of the first embodiment. The prism sheet 18A is configured by filling with resin a groove 186 that is formed by an extended line of the inclined face portion 181 of the prism sheet 18, the inclined face portion 182, and the perpendicular face portion 183 and has a triangular cross section. It is preferable that the resin with which the groove 186 is filled have a refractive index (n) smaller than that of the prism body, because the resin having such a refractive index ensures total reflection at an interface. As the material of the prism body, resin material is preferable that has a refractive index reduced by impregnating acrylic-based resin (n to 1.5) or polycarbonate resin (n to 1.59) with fluorine-based resin (n to 1.35) or intermediate particles.

Second Embodiment

FIG. 13 is a cross-sectional view illustrating a configuration of a prism sheet of a display device according to the second embodiment. The display device according to the second embodiment is the same as the display device according to the first embodiment, except for the prism sheet. The prism sheet 18B includes a plurality of prisms 186B having a constant apex angle (θ) continuously arranged in one direction on a lower surface of the prism sheet 18B that serves as a light-incident surface. In a case where the prism sheet 18B is applied to the edge-lit type backlight unit 20 as in the present embodiment, the arranging direction of the prisms 186B is set to be along a direction in which light emitted from the point light source 22 mainly travels (Y-direction), while ridge lines of the prisms 186B are set to extend a direction (X-direction) crossing the traveling direction (Y-direction) of the light of the point light source 22. Note that the direction of the ridge lines is perpendicular to the light traveling direction in the present embodiment, but is not limited thereto.

An inclined face portion 181B that is one of a pair of prism inclined surfaces forming the prism 186B, located closer to the light source, is formed as an incident portion on which light exiting from the light-exiting surface of the light guiding plate 21 is incident. The other inclined face portion 182B is formed as a total reflection surface that bends the light incident on the inclined face portion 181B to the perpendicular direction. The inclined face portion 181B and the inclined face portion 182B are formed to have approximately the same size (the length of inclination), the inclined face portion 181B is formed to have the same size between the prisms 186B, and the inclined face portion 182B is formed to have the same size between the prisms 186B. The prisms 186B are formed to have the same height and the same arrangement pitch (the distance between the prism apices). A value of prism pitch/pixel pitch in the display cell is 0.1 to 0.5.

The prism sheet 18B is formed by a transparent film or sheet that has the same or similar light permeability as/to the prism sheet 18, and beads 188 are dispersed in a prism base portion 187. With this structure, light input to the prism base portion 187 is scattered by the beads 188, so that a light-emitting region can be enlarged as compared with that in the prism sheet according to the second comparative example, and moire fringes can be reduced. Note that the prisms can be formed by a separate member from the prism base portion.

<Modification 2-1>

FIG. 14 is a cross-sectional view illustrating a configuration of a prism sheet of a display device according to a first modification of the second embodiment. The prism sheet 18B1 is the same as the prism sheet 18B, except for a range where the beads are dispersed. In the prism sheet 18B1, the beads 188 are dispersed and arranged all over the prism sheet.

<Modification 2-2>

Figure 15:
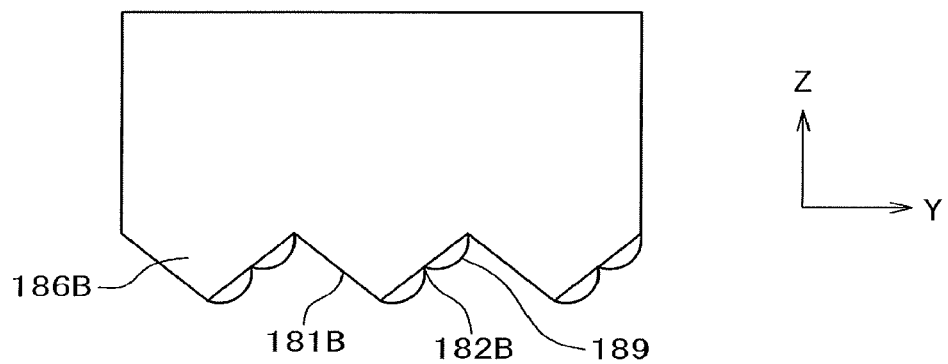
FIG. 15 is a cross-sectional view illustrating a configuration of a prism sheet in a display device according to a second modification of the second embodiment.

FIG. 15 is a cross-sectional view illustrating a configuration of a prism sheet of a display device according to a second modification of the second embodiment. The prism sheet 18B2 is the same as the prism sheet 18B, except for a portion in which the beads are arranged. In the prism sheet 18B2, no beads are arranged within the prism sheet, but a concave-convex shape 189 is formed on a surface of the inclined face portion 182B of the prism 186B. The concave-convex shape provided in the inclined face portion 182B is formed by dispersing beads on the surface of the inclined face portion 182B or performing surface treatment for the inclined face portion 182B. Instead of the beads, hemispherical projections may be formed, for example.

Third Embodiment

Figure 16A:
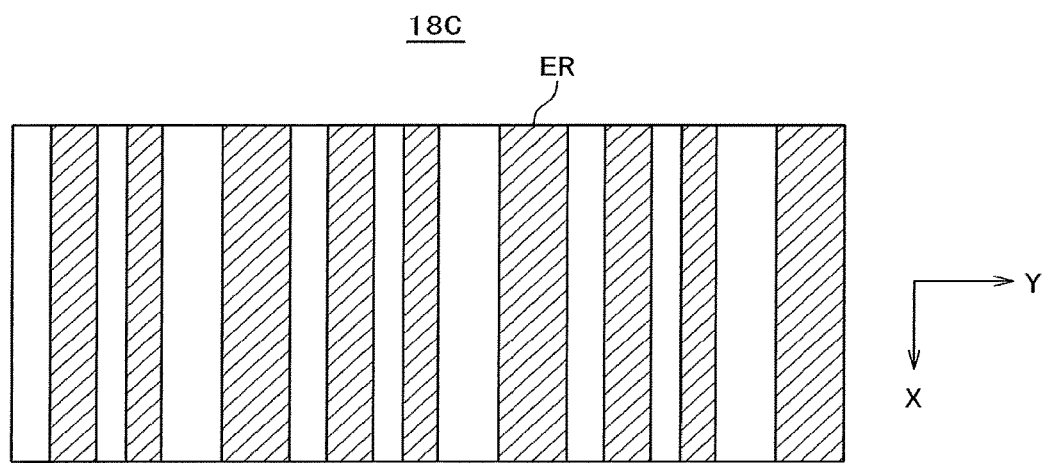
FIG. 16A is a plan view for explaining a prism sheet in a display device according to a third embodiment.
Figure 16B:
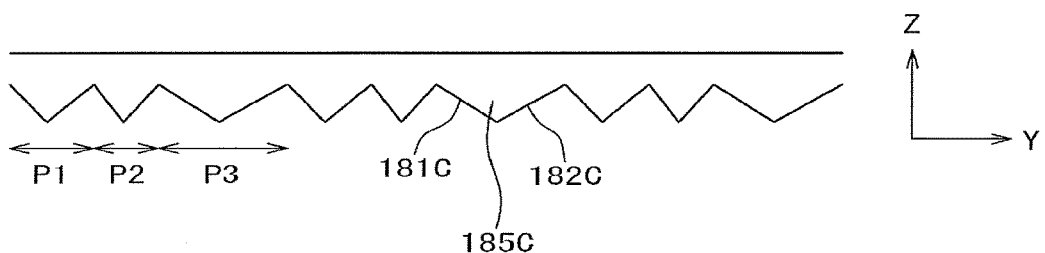
FIG. 16B is a cross-sectional view of the prism sheet.

FIG. 16A is a plan view for explaining a prism sheet of a display device according to the third embodiment, and FIG. 16B is a cross-sectional view. The display device according to the third embodiment is the same as the display device according to the first embodiment, except for the prism sheet. The prism sheet 18C includes a plurality of prisms 185C continuously arranged in one direction on a lower surface of the prism sheet 18C that serves as a light-incident surface. In a case where the prism sheet 18C is applied to the edge-lit type backlight unit 20 as in the present embodiment, the arranging direction of the prisms 185C is set to be along a direction in which light emitted from the point light source 22 mainly travels (Y-direction), while ridge lines of the prisms 185C are set to extend a direction (X-direction) crossing the traveling direction (Y-direction) of the light of the point light source 22. Note that the direction of the ridge lines is perpendicular to the light traveling direction in the present embodiment, but is not limited thereto.

An inclined face portion 181C that is one of a pair of prism inclined surfaces forming the prism 185C, located closer to the light source, is formed as an incident portion on which light exiting from the light-exiting surface of the light guiding plate 21 is incident. The other inclined face portion 182C is formed as a total reflection surface that bends the light incident on the inclined face portion 181C to the perpendicular direction. Apex angles (θ), and the sizes of the inclined face portions 181C and 182C are formed to be different between the prisms 185C. However, in each prism 185C, the size of the inclined face portion 181C and the size of the inclined face portion 182C have approximately the same inclination length. The prisms 185C are formed to have the same height, but have different arrangement pitches (the distances between the prism apices). A value of prism pitch/pixel pitch in the display cell is 0.1 to 0.5.

The prism sheet 18C is formed by a transparent film or sheet that has the same or similar light permeability as/to the prism sheet 18.

By irregularly changing the prism arrangement pitch, moire fringes can be reduced.

Fourth Embodiment

Figure 17A:
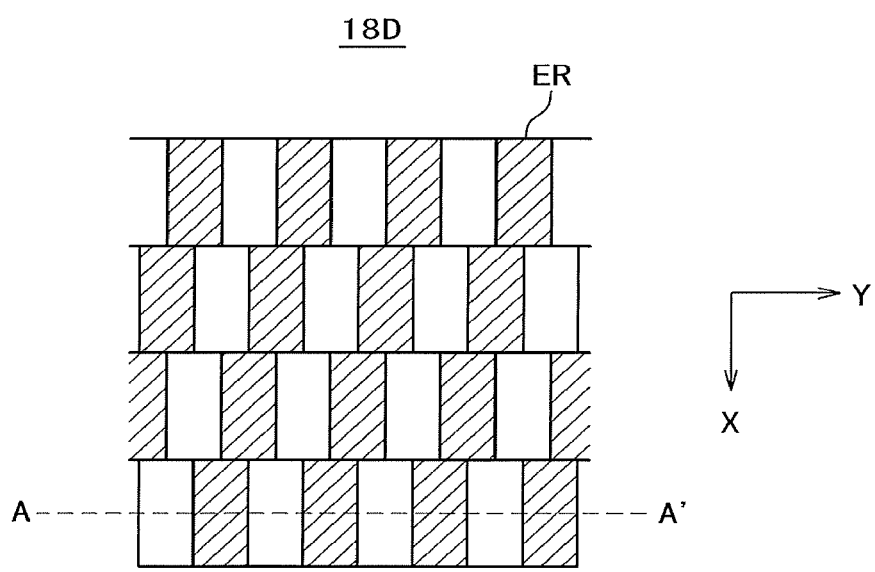
FIG. 17A is a plan view for explaining a prism sheet in a display device according to a fourth embodiment.
Figure 17B:
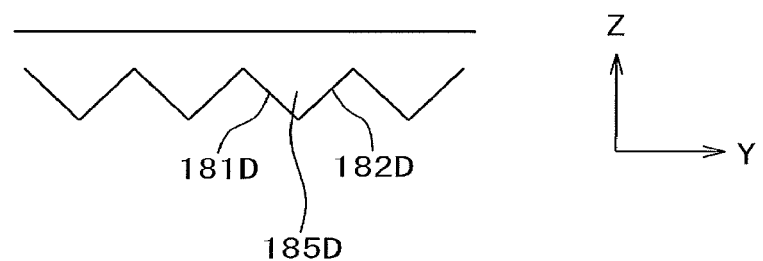
FIG. 17B is a cross-sectional view of the prism sheet.

FIG. 17A is a plan view for explaining a prism sheet of a display device according to the fourth embodiment, and FIG. 17B is a cross-sectional view. The display device according to the fourth embodiment is the same as the display device according to the first embodiment, except for the prism sheet. The prism sheet 18D includes a plurality of prisms 185D having a constant apex angle (θ) continuously arranged in one direction on a lower surface of the prism sheet 18D that serves as a light-incident surface. In a case where the prism sheet 18D is applied to the edge-lit type backlight unit 20 as in the present embodiment, the arranging direction of the prisms 185D is set to be along a direction in which light emitted from the point light source 22 mainly travels (Y-direction), while ridge lines of the prisms 185D are set to extend a direction (X-direction) crossing the traveling direction (Y-direction) of the light of the point light source 22. Note that the direction of the ridge lines is perpendicular to the light traveling direction in the present embodiment, but is not limited thereto. Further, the prisms 185D are arranged to be shifted in a stepwise manner in Y-direction for every predetermined length in the direction of the ridge lines.

An inclined face portion 181D that is one of a pair of prism inclined surfaces forming the prism 185D, located closer to the light source, is formed as an incident portion on which light exiting from the light-exiting surface of the light guiding plate 21 is incident. The other inclined face portion 182D is formed as a total reflection surface that bends the light incident on the inclined face portion 181D to the perpendicular direction. The inclined face portion 181D and the inclined face portion 182D are formed to have the same size as each other, the inclined face portion 181D is formed to have the same size between the prisms 185D, and the inclined face portion 182D is formed to have the same size between the prisms 185D. The prisms 185D are formed to have the same height and the same arrangement pitch (the distance between the prism apices). A value of prism pitch/pixel pitch is 0.1 to 0.5.

The prism sheet 18D is formed by a transparent film or sheet that has the same or similar light permeability as/to the prism sheet 18.

<Modification 4-1>

Figure 18A:
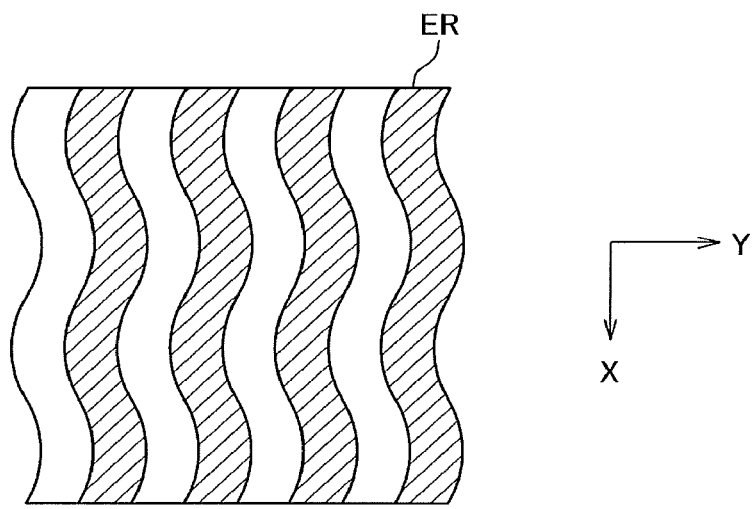
FIG. 18A is a plan view for explaining a prism sheet in a display device according to a first modification of the fourth embodiment.
Figure 18B:
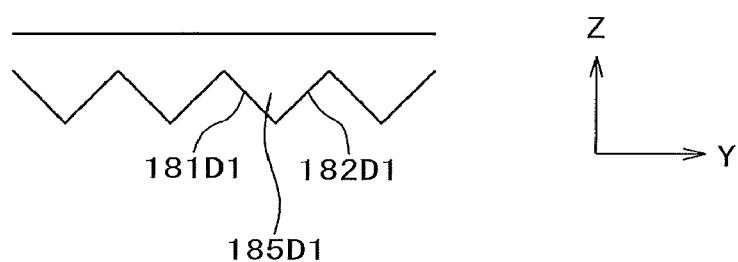
FIG. 18B is a cross-sectional view of the prism sheet.

FIG. 18A is a plan view for explaining a prism sheet of a display device according to a first modification of the fourth embodiment, and FIG. 18B is a cross-sectional view. The prism sheet according to the first modification is the same as the prism sheet according to the fourth embodiment, except for a shape of the ridge lines of the prisms. The ridge lines of the prisms 185D1 are formed to be wavy.

<Modification 4-2>

Figure 19A:
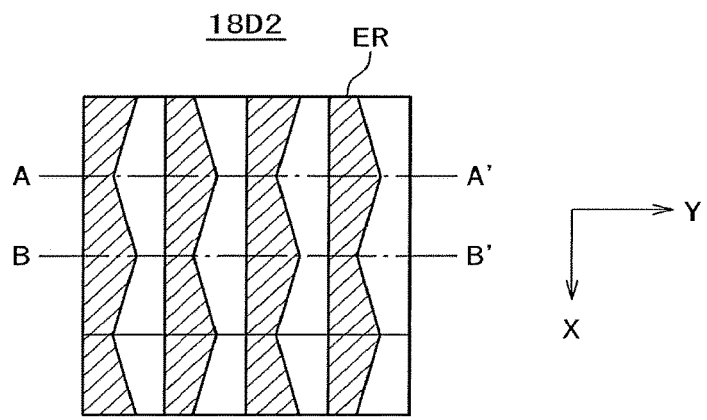
FIG. 19A is a plan view for explaining a prism sheet in a display device according to a second modification of the fourth embodiment.
Figure 19B:
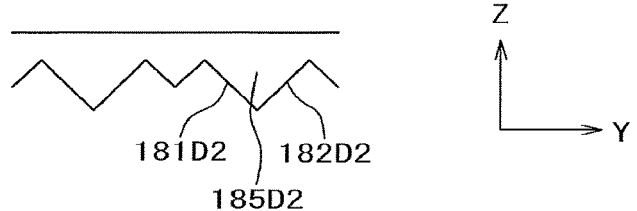
FIG. 19B is a cross-sectional view taken along line A-A' in FIG. 19A.
Figure 19C:
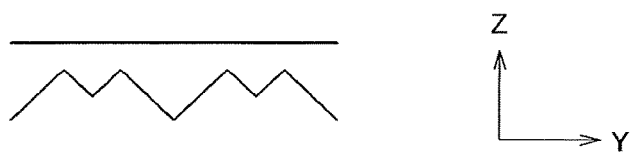
FIG. 19C is a cross-sectional view taken along line B-B' in FIG. 19A.
Figure 19D:
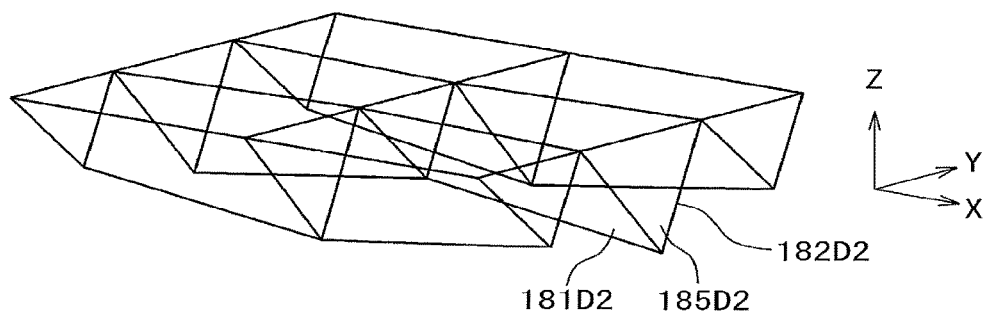
FIG. 19D is a perspective view thereof.

FIG. 19A is a plan view for explaining a prism sheet of a display device according to a second modification of the fourth embodiment, FIG. 19B is a cross-sectional view taken along line A-A' in FIG. 19A, FIG. 19C is a cross-sectional view taken along line B-B' in FIG. 19A, and FIG. 19D is a perspective view. The display device according to the second modification is the same as the display device according to the first embodiment, except for the prism sheet. The prism sheet 18D2 includes a plurality of prisms 185D2 having a constant apex angle (θ) continuously arranged in one direction on a lower surface of the prism sheet 18D2 that serves as a light-incident surface. In a case where the prism sheet 18D2 is applied to the edge-lit type backlight unit 20 as in the present embodiment, the arranging direction of the prisms 185D2 is set to be along a direction in which light emitted from the point light source 22 mainly travels (Y-direction), while ridge lines of the prisms 185D2 are set to extend a direction (X-direction) crossing the traveling direction (Y-direction) of the light of the point light source 22. Note that the direction of the ridge lines is perpendicular to the light traveling direction in the present embodiment, but is not limited thereto. Further, the prisms 185D2 are arranged to be changed a height of Z-direction for every predetermined length in the direction of the ridge line.

An inclined face portion 181D2 that is one of a pair of prism inclined surfaces forming the prism 185D2, located closer to the light source, is formed as an incident portion on which light exiting from the light-exiting surface of the light guiding plate 21 is incident. The other inclined face portion 182D2 is formed as a total reflection surface that bends the light incident on the inclined face portion 181D2 to the perpendicular direction. The inclined face portion 181D2 and the inclined face portion 182D2 are formed to have the same size as each other, the inclined face portion 181D2 is formed to have the same size between the prisms 185D2, and the inclined face portion 182D2 is formed to have the same size between the prisms 185D2. The prisms 185D2 are formed to have different inclination lengths in X-direction, have different heights in X-direction, and the same arrangement pitch (the distance between the prism apices). A value of prism pitch/pixel pitch in the display cell is 0.1 to 0.5.

The prism sheet 18D2 is formed by a transparent film or sheet that has the same or similar light permeability as/to the prism sheet 18.

Fifth Embodiment

Figure 20A:
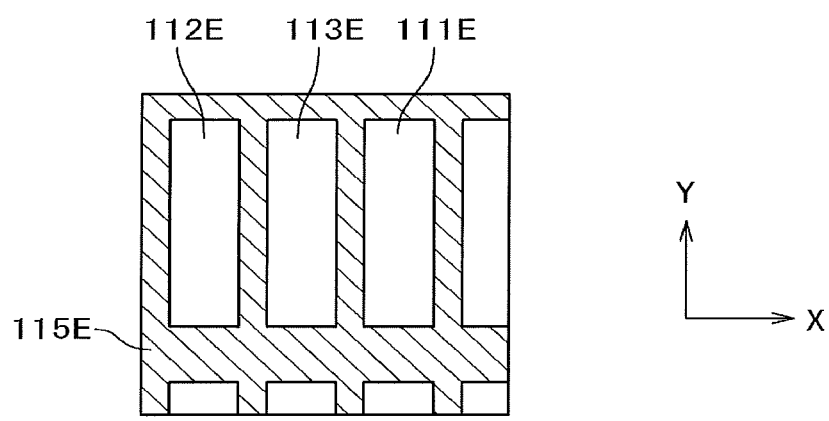
FIGS. 20A and 20B are plan views for explaining an arrangement of a prism sheet suitable for an RGB pixel arrangement according to a fifth embodiment.
Figure 20B:
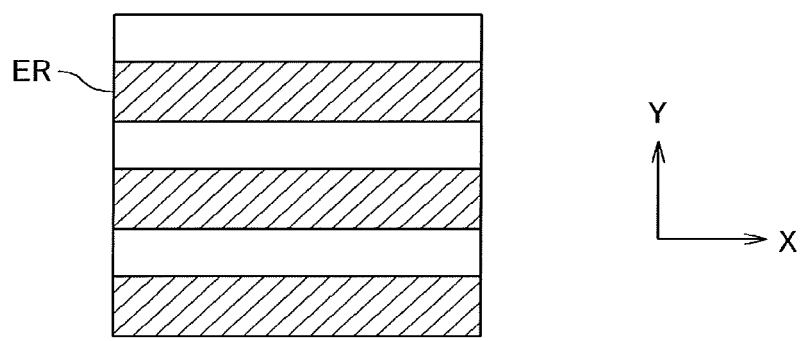

FIGS. 20A and 20B are plan views for explaining an arrangement of a prism sheet suitable for an RGB pixel arrangement. FIG. 20A is a plan view illustrating the pixel arrangement, and FIG. 20B is a plan view of the prism sheet.

As illustrated in FIG. 20A, pixels of the RGB arrangement each include a red (R) sub-pixel 111E, a green (G) sub-pixel 112E, and a blue (B) sub-pixel 113E, and the R sub-pixel 111E, the G sub-pixel 112E, and the B sub-pixel 113E are arranged in X-direction in that order. Each of the R sub-pixel 111E, the G sub-pixel 112E, and the B sub-pixel 113E is vertically long, i.e., has a shape in which an X-direction length is shorter than a Y-direction length. Although not illustrated, below a light-shielding layer 115E, a gate line (a scanning line) extends in X-direction and a source line (a video line) extends in Y-direction.

As illustrated in FIG. 20B, ridge lines of prisms of the prism sheet extend along X-direction. This can be applied to the prism sheets of the second comparative example, the first embodiment and its first modification, the second embodiment and its first and second modifications, the third embodiment, and the fourth embodiment and its first and second modifications.

A combination of the pixel arrangement of FIG. 20A and the prism sheet of FIG. 20B is effective in reducing moire fringes.

Sixth Embodiment

Figure 21A:
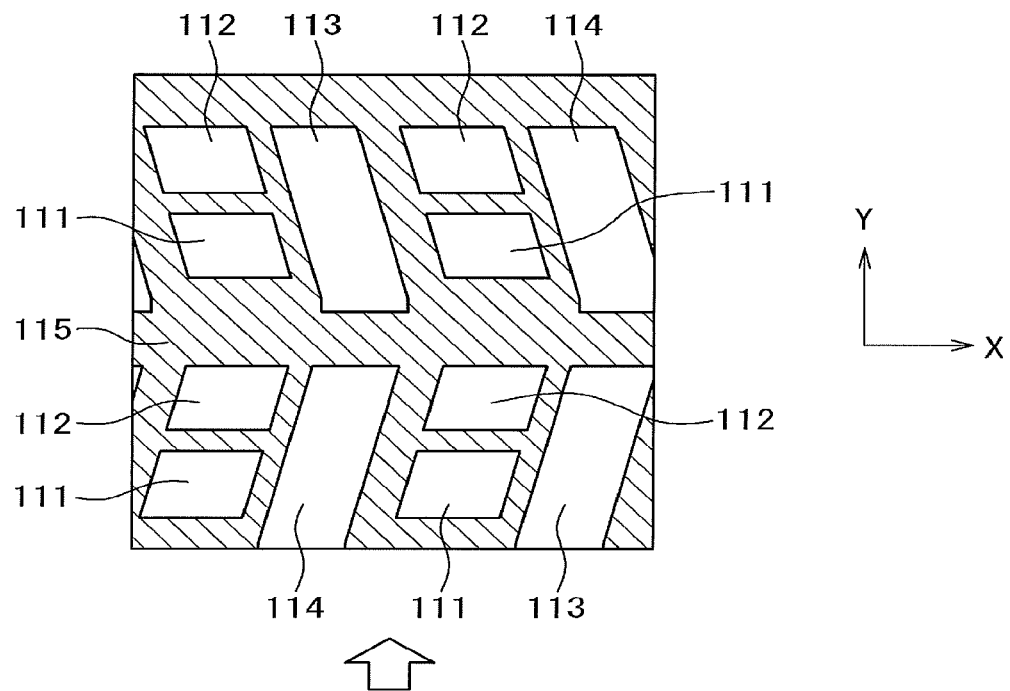
FIGS. 21A and 21B are plan views for explaining an arrangement of a prism sheet suitable for RGBW pixel arrangements according to a sixth embodiment.
Figure 21B:
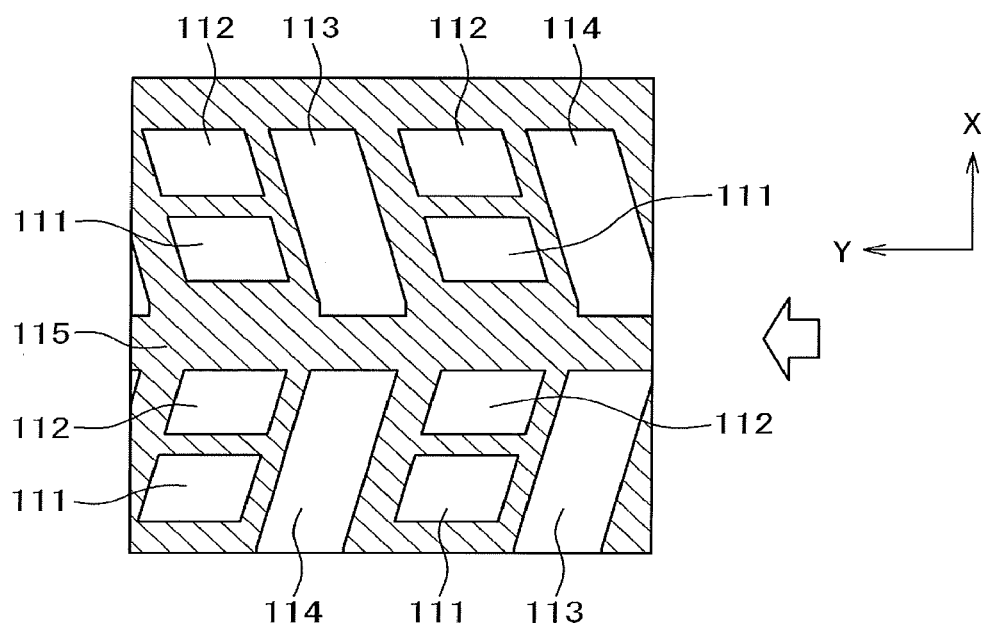

FIGS. 21A and 21B are plan views for explaining an arrangement of a prism sheet suitable for an RGBW pixel arrangement. FIG. 21A is a plan view illustrating a first example of the pixel arrangement, and FIG. 21B is a plan view illustrating a second example of the pixel arrangement.

Pixels in the RGBW pixel arrangement include first pixels each formed by an R sub-pixel 111, a G sub-pixel 112, and a B sub-pixel 113 and second pixels each formed by the R sub-pixel 111, the G sub-pixel 112, and a white (W) sub-pixel 114. The firsts pixel and the second pixels are alternately arranged in X and Y-directions. A width of a light-shielding layer arranged in the pixels is narrower than that arranged between the pixels. The present embodiment can be applied to the prism sheets of the second comparative example, the first embodiment and its first modification, the second embodiment and its first and second modifications, the third embodiment, and the fourth embodiment and its first and second modifications.

The R sub-pixel 111 and the G sub-pixel 112 of the first pixel of FIG. 21A are adjacent to each other in Y-direction, while the R sub-pixel 111 and the G sub-pixel 112 are adjacent to the B sub-pixel 113 in X-direction. The R sub-pixel 111 and the G sub-pixel 112 of the second pixel of FIG. 21A are adjacent to each other in Y-direction, while the R sub-pixel 111 and the G sub-pixel 112 are adjacent to the W sub-pixel 114 in X-direction. Although not illustrated, below the light-shielding layer 115, a gate line extends in X-direction and a source line extends in Y-direction while bending. A light source is arranged on the lower side in FIG. 21A (shown with white arrow). The ridge lines of the prisms in the prism sheet extend along X-direction as in FIG. 20B.

The R sub-pixel 111 and the G sub-pixel 112 of the first pixel of FIG. 21B are adjacent to each other in X-direction, while the R sub-pixel 111 and the G sub-pixel 112 are adjacent to the B sub-pixel 113 in Y-direction. The R sub-pixel 111 and the G sub-pixel 112 of the second pixel of FIG. 21B are adjacent to each other in X-direction, while the R sub-pixel 111 and the G sub-pixel 112 are adjacent to the W sub-pixel 114 in Y-direction. Although not illustrated, below the light-shielding layer 115, the gate line extends in Y-direction and the source line extends in X-direction while bending. The light source is arranged on the right in FIG. 21B (shown with white arrow). The ridge lines of the prisms in the prism sheet extend along X-direction as in FIG. 20B.

FIG. 22 shows an image of moire fringes for the pixels of FIGS. 21A and 21B. A pixel pitch is 46.2 μm×23.1 μm and a prism pitch is 18 μm. (A) corresponds to the pixels of FIGS. 21A and (B) corresponds to the pixels of FIG. 21B. (B) (FIG. 21B) is weaker in contrast than in (A) (FIG. 21A), and generation of the moire fringes can be reduced. In FIG. 22, the contrast is shown while being enhanced.

What is claimed is:

1. A display device comprising:
    a display panel; and
    a backlight unit including a light guiding plate, wherein
    the display panel includes a display cell and a prism sheet attached to the display cell,
    the prism sheet includes a plurality of prisms opposed to a surface of the light guiding plate and are arranged in a second direction,
    each of the prisms extends in a first direction and has a first inclined face on a side on which light from the light guiding plate is incident and a second inclined face on a side reflecting the incident light,
    the first inclined face includes a first area and a second area,
    the first area of the first inclined face connects with the second inclined face and makes a ridge line of the prism,
    a length of the first area of the first inclined face is shorter than a length of the second inclined face in a cross section of each of the prisms along the second direction,
    each of the prisms has a vertical face extending from a connecting point of the first area and the second area of the first inclined face towards a base portion of another adjacent one of the prisms,
    a portion of the prism sheet, surrounded by the vertical face, the second inclined face of the adjacent one of the prisms, and the second area of the first inclined face, are filled with resin having a smaller refractive index than a refractive index of the first area of the first inclined face, and
    the first area and the second area of the first inclined face to contact air.
2. The display device according to claim 1, wherein
    an angle between the vertical face and a perpendicular of the surface of the light guiding plate is smaller than an angle between the first inclined face and the perpendicular.
3. The display device according to claim 1, wherein
    the display cell includes a first pixel formed by a first sub-pixel, a second sub-pixel, and a third sub-pixel, and a second pixel formed by the first sub-pixel, the second sub-pixel, and a fourth sub-pixel,
    a length in the first direction of each of the third and fourth sub-pixels is longer than a length in the second direction thereof in a plan view,
    the first sub-pixel is adjacent to the second sub-pixel in the first direction,
    the third sub-pixel is adjacent to the first and second sub-pixels in the second direction,
    the fourth sub-pixel is adjacent to the first and second sub-pixels in the second direction, and
    the first pixel and the second pixel are alternately arranged in the first and second directions.
4. The display device according to claim 3, wherein the display cell includes a gate line extending in the second direction.

* * * * *